United States Patent [19]
Brookman

[11] 3,864,108
[45] Feb. 4, 1975

[54] DUST COLLECTOR WITH JET INDUCED REVERSE AIR CLEANING

[75] Inventor: Roger S. Brookman, East Aurora, N.Y.

[73] Assignee: American Precision Industries, Inc., Buffalo, N.Y.

[22] Filed: May 29, 1973

[21] Appl. No.: 364,963

[52] U.S. Cl............... 55/302, 55/341, 55/350, 55/379
[51] Int. Cl............................................. B01d 46/04
[58] Field of Search ............ 55/302, 273, 284, 341, 55/379, 484, 350

[56] References Cited
UNITED STATES PATENTS

| | | | |
|---|---|---|---|
| 3,394,532 | 7/1968 | Oetiker | 55/302 |
| 3,513,638 | 5/1970 | Young | 55/302 X |
| 3,716,971 | 2/1973 | Reinauer | 55/302 X |
| 3,765,152 | 10/1973 | Pausch | 55/302 X |

*Primary Examiner*—Frank W. Lutter
*Assistant Examiner*—Kathleen J. Prunner

[57] ABSTRACT

A double-wall dust collector has an entrance chamber provided with an outlet opening and arranged to receive a flow of entrance gas laden with suspended particulate material, a gas-permeable filter medium operatively associated with the outlet opening to separate suspended solids from a flow of cleaned gas passing therethrough, and a reception chamber arranged to receive the flow of cleaned gas. A conduit communicates with an end of the reception chamber and serves to direct a flow of cleaned gas from the reception chamber to an exhaust outlet. The conduit is provided with an internal venturi jet pump means periodically operable for pumping cleaned gas to flow in a reverse direction thereby abruptly raising the pressure on the cleaned gas side of the filter medium to shock off particulate matter collected on the opposite side thereof. In one embodiment, a pair of such conduits, severally communicating with opposite ends of the reception chamber, are provided to direct simultaneously discharged countercurrent pulses toward one another in the reception chamber to amplify the effect of the reverse air cleaning.

10 Claims, 8 Drawing Figures

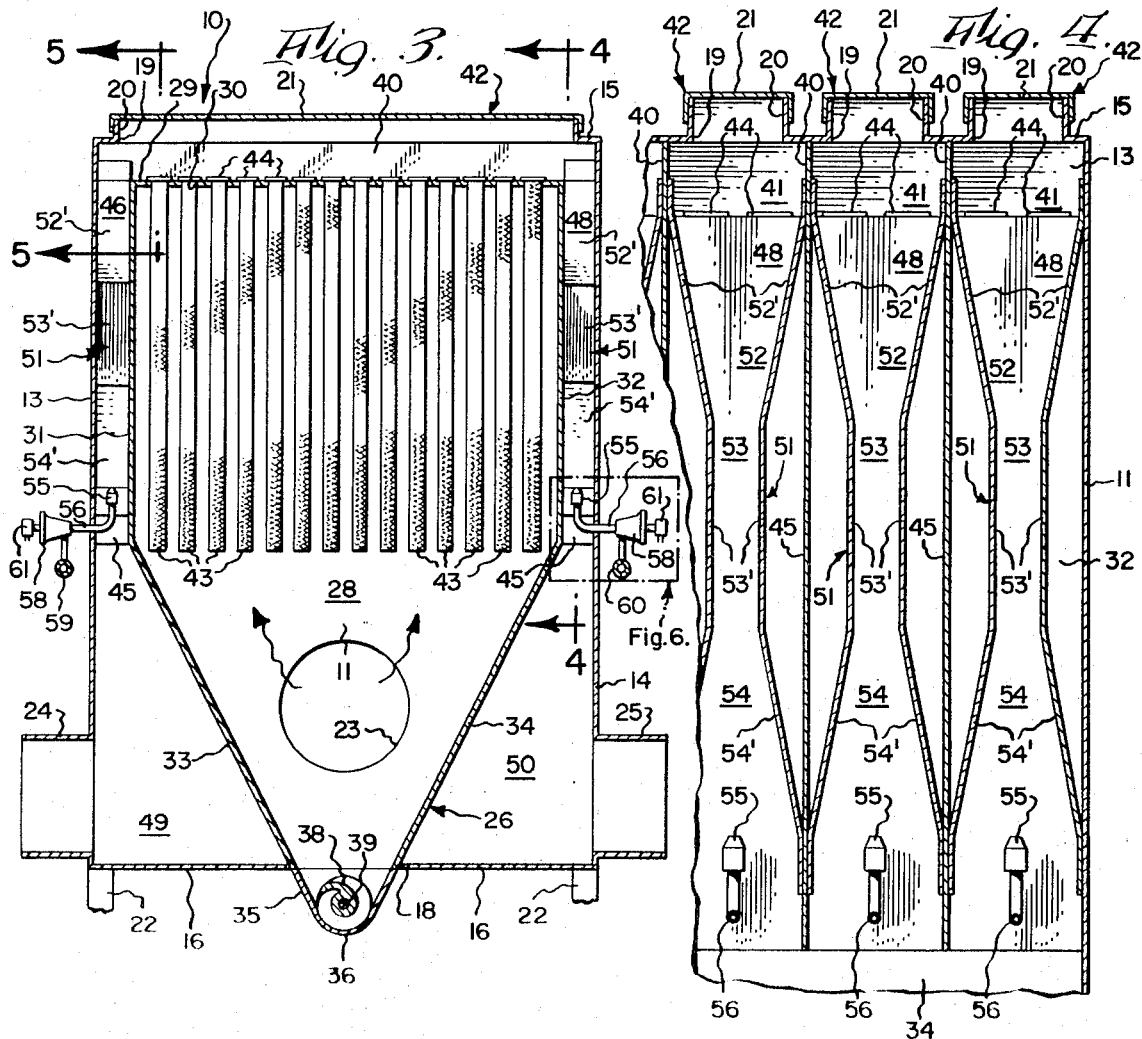
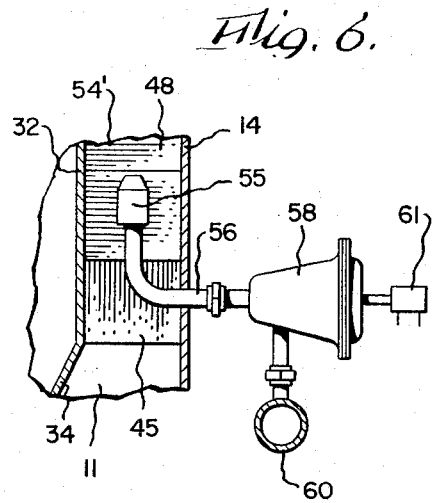
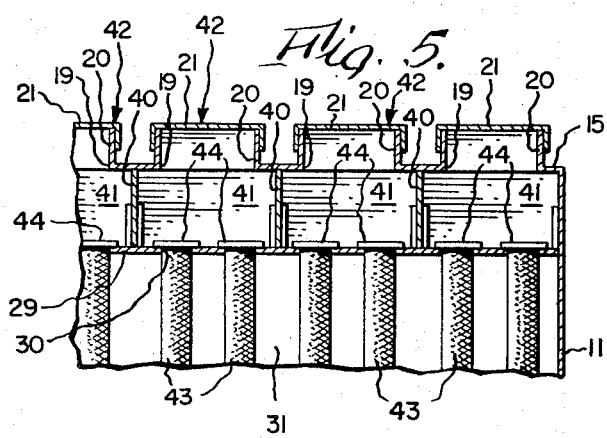

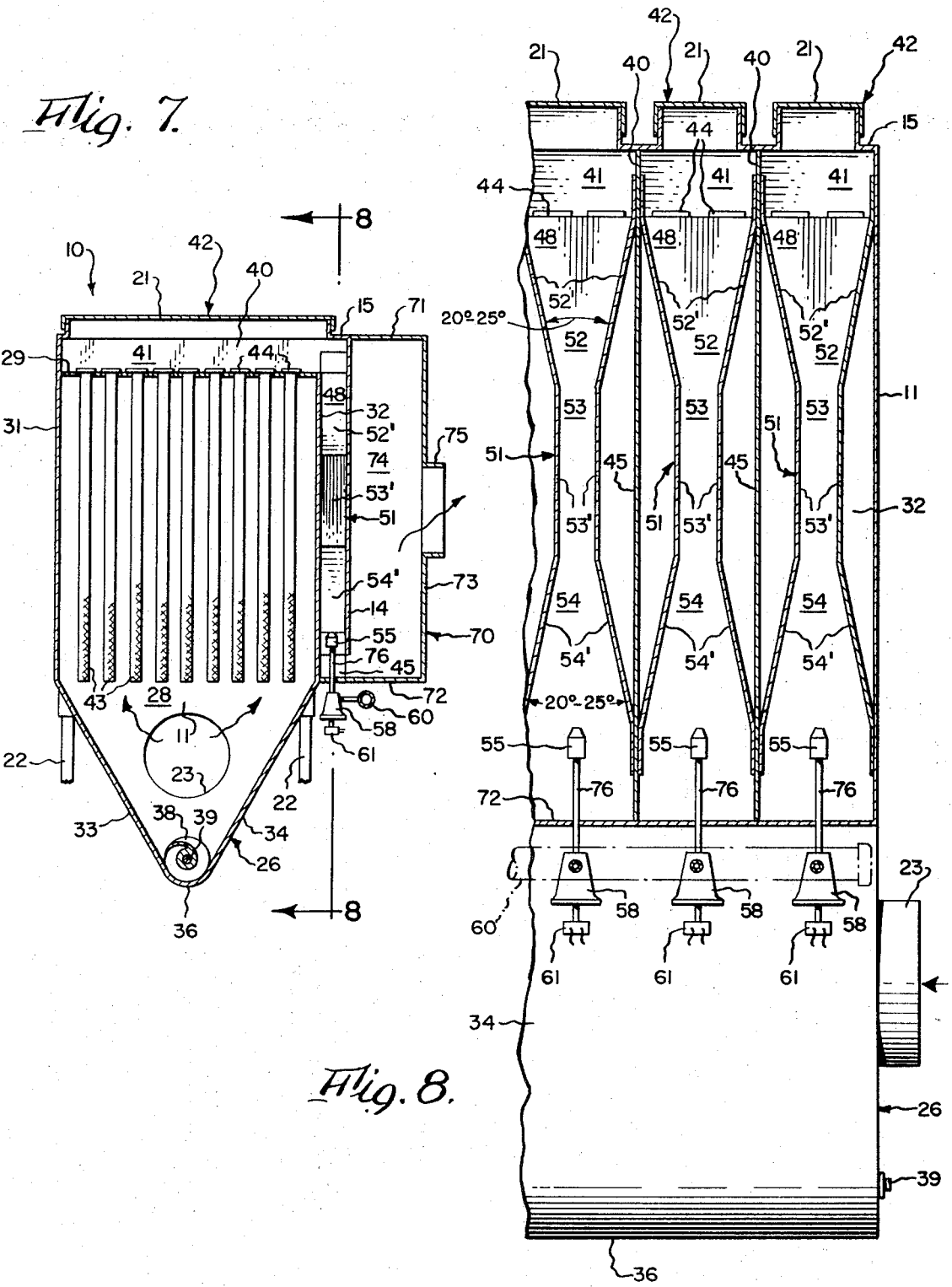

DUST COLLECTOR WITH JET INDUCED REVERSE AIR CLEANING

BACKGROUND OF THE INVENTION

1. Field of the Invention

The present invention relates to dust collector apparatus for separating suspended particulate material from a gas to be cleaned.

2. Description of the Prior Art

Dust collectors are known and generally comprehend the passage of a contaminated gas through a filter medium capable of separating the suspended solid or particulate material from cleaned gas passing therethrough. While the structure and operation of such dust collectors is known, several problems are attendant to their normal operation.

One such problem is that the suspended particulate material tends to collect on the filter medium, clogging its pores and increasing the frictional resistance to gas flow therethrough.

Earlier attempts to solve this problem are typified by Church U.S. Pat. No. Re 24,954 and Reinauer U.S. Pat. No. 3,368,328. While both Church and Reinauer disclosed structure to provide a momentary countercurrent flow of reverse air through the filter medium to dislodge particulate material adhering thereto by discharging a countercurrent pulse of purge gas through a venturi-like tube, Church provided one such tube for each filter medium and although Reinauer serviced a plurality of filter media with one such tube this tube was the outlet member adjacent the cleaned gas reception chamber.

However, this earlier solution proposed by Church was structurally uneconomical and that proposed by Reinauer is not believed to have been wholly satisfactory to clean a plurality of filter bags. Accordingly, applicant has devised simple and yet highly effective apparatus for cleaniong a large number of filter bags suspended in a contaminated atmosphere.

SUMMARY OF THE INVENTION

The present invention provides a dust collector having a first enclosure defining an entrance chamber therewithin arranged to receive a flow of entrance gas laden with suspended particulate material. An outlet opening is provided through a wall of the first enclosure. A gas-permeable filter medium closes the outlet opening and operates to separate the particulate material from a flow of cleaned gas passing therethrough. A second enclosure joins the first enclosure to define a reception chamber therebetween to receive the flow of cleaned gas passing through the filter medium. A first conduit directs a first flow of cleaned gas from the reception chamber to an exhaust outlet. A similar second conduit may also communicate with the reception chamber to direct a second flow of cleaned gas to a second exhaust outlet. Each of such conduits has arranged therein selectively operable venturi jet pump means for pumping cleaned gas to flow in a direction opposite to the normal direction thereby abruptly raising the pressure on the cleaned gas side of the filter medium to shock off particulate matter collected on the opposite side thereof. Each such venturi jet pump means includes a normally upstream diffuser section, a normally downstream diffuser section, a throat section intermediate said diffuser sections, and a nozzle arranged to discharge a jet of compressed gas in a direction opposite to normal flow such throat section.

In order that the jet pump action is efficient so that there is a high mass ratio of pumped gas to the compressed gas in the jet discharged by the nozzle, the throat section is made relatively long.

In order that the conduit may handle bidirectional flow of gas efficiently so that there is a minimum of energy loss, the diffuser sections are made relatively long and substantially equal in length. Preferably, the throat and diffuser sections are substantially equal in length one to another.

Accordingly, the primary object of the present invention is to provide a dust collector having a filter medium which can be cleaned by reversing the direction of flow of the greatest mass of cleaned gas available in the shortest possible time in order to raise abruptly the pressure on the cleaned gas side of the filter medium and thereby shock off particulate matter collected on the opposite side thereof.

Another object is to provide such a dust collector which has no moving parts arranged within any gas handling chamber.

Another object is to provide such a dust collector which has two cleaned gas reversals occurring simultaneously from opposite directions so that the impingement of their effects augments the pressure rise utilized for reverse air cleaning.

These and other objects and advantages will become apparent from the foregoing and ongoing specification, the drawings, and the appended claims.

BRIEF DESCRIPTION OF THE DRAWINGS

FIG. 3 is a vertical transverse sectional view thereof taken on line 3—3 of FIG. 1 and cross-sectionally illustrates the internal first enclosure, the entrance chamber, a reception chamber, and a left and right conduit.

FIG. 4 is an enlarged fragmentary vertical longitudinal sectional view thereof taken on line 4-4 of FIG. 3 and showing the configuration of the internal restrictions within the conduits on the right side of the collector and the location of the jet nozzles therebelow.

FIG. 5 is an enlarged fragmentary vertical longitudinal sectional view thereof taken on line 5-5 of FIG. 3 and particularly illustrates the filter bags arranged between the reception chamber and the entrance chamber.

FIG. 6 is a greatly enlarged fragmentary view, taken as indicated in FIG. 3, of the nozzle, diaphragm valve, and the supply means.

FIG. 7 is a vertical transverse sectional view, similar to FIG. 3, of another preferred embodiment of the present invention and particularly illustrates the use of a single conduit and the provision of a lateral plenum chamber.

FIG. 8 is an enlarged fragmentary vertical longitudinal sectional view thereof taken on line 8-8 of FIG. 7, and showing the modified arrangement of the jet nozzles.

DESCRIPTION OF THE PREFERRED EMBODIMENTS

Figure 1:
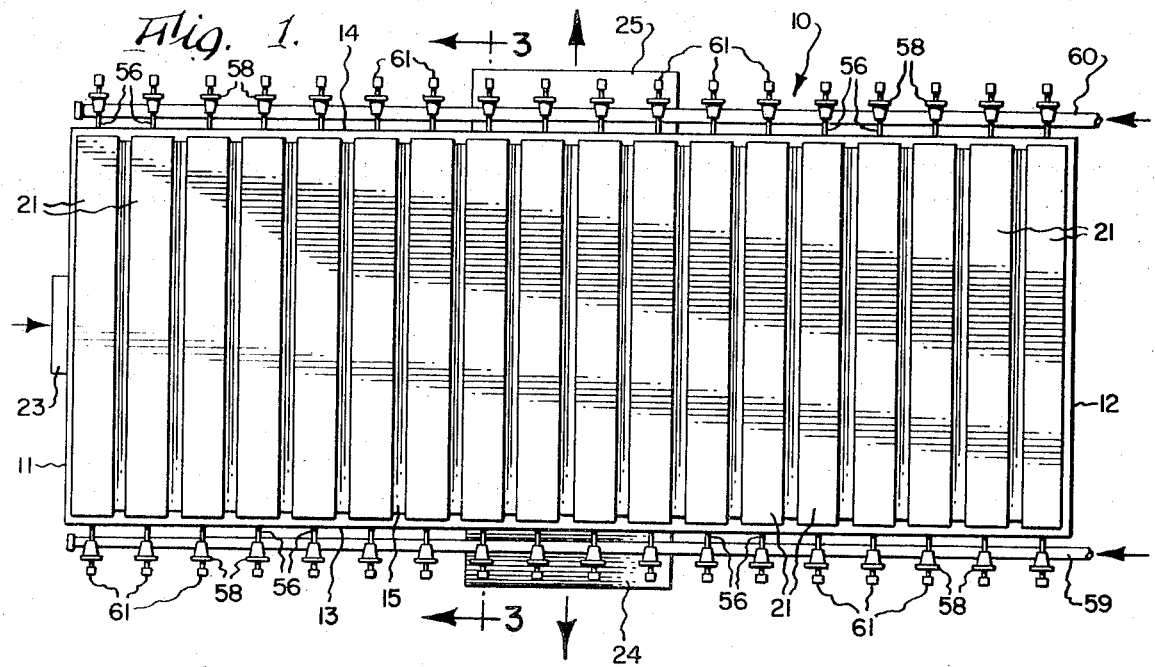
FIG. 1 is a top plan view of the improved dust collector embodying the present invention and particularly illustrates the exterior of the outer box-like structure, the access covers, and the supply means for jet gas.
Figure 2:
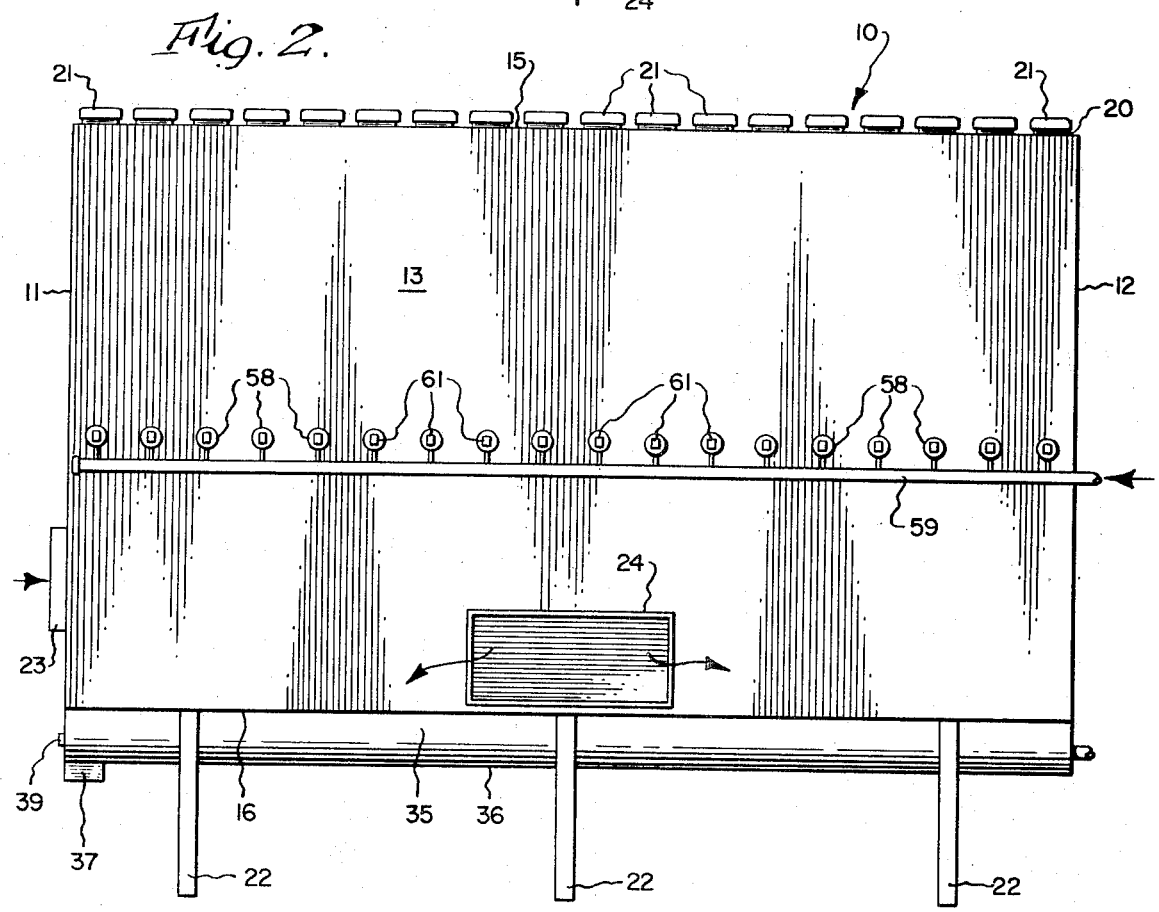
FIG. 2 is a side elevational view of the dust collector depicted in FIG. 1, this being considered the left side of the collector as viewed from the bottom of FIG. 1.

Referring to a first preferred embodiment illustrated in FIGS. 1 and 2, the inventive double-wall dust collector 10 is exteriorly illustrated as being a rectangular box-like structure having vertical front and rear end panels 11 and 12, respectively, vertical left and right outer side panels 13 and 14, respectively, a horizontal outer top panel 15, and a horizontal outer bottom panel 16 provided with an enlongated rectangular central through slot 18 extending the length of the bottom panel from its intersection with the front end panel 11 to its intersection with the rear end panel 12. As best illustrated in FIGS. 3-5, the top panel 15 is shown provided with longitudinally-spaced, transversely elongated, rectangular access openings 19 extending substantially the full width of panel 15, there being eighteen such openings in the embodiment illustrated. Each of these access openings 19 is provided with a perimetrical raised collar 20 upon which an access cover 21 rests eighteen such covers being shown in FIGS. 1 and 2. If desired, these access covers 21 may be removably secured to collars 20 by suitable fasteners (not shown) or the like. The dust collector 10 is shown supported by a plurality of vertical legs 22 depending from the bottom panel 16 and arranged to rest on suitable supportive structure such as concrete pads, footings, or the like (not shown).

The dust collector 10 is operative to receive a flow of entrance gas laden with particulate or solid material via inlet 23 provided through front end panel 11, to separate the particulate material from the entrance gas, and to exhaust cleaned gas to the atmosphere or other dust work (not shown) via outlets 24 and 25 provided through the left and right outer side panels 13 and 14 respectively.

As best shown in FIG. 3, a first enclosure 26 is arranged within a box-like outer structure to bound and define a large volume entrance chamber 28 into which entrance gas may be admitted through inlet 23. This first enclosure 26 extends the length of the dust collector from the front end panel 11 to the rear end panel 12 and is illustrated in cross-section as having a horizontal upper first wall 29 spaced from the outer top panel 15 and provided with a plurality of openings 30 therethrough; vertical second or left and fourth or right upper side walls 31 and 32 spaced from the left and right outer side panels 13 and 14, respectively; and planar left and right lower side walls 33 and 34, respectively, inclined downwardly and inwardly and extending through slot 18 to converge therebelow into a V-shaped trough 35 having a rounded bottom 36. These inclined left and right lower walls 33, 34 form the side walls of a lower hopper-like structure to direct separated particulate matter down into the lower trough 35.

A screw conveyor 38 is arranged within trough 35 and is mounted for rotation about a central shaft 36 the ends of which are suitably journalled in end panels 11, 12 and driven by a suitable rotary power source (not shown). When operated, this screw conveyor 38 may convey accumulations of solid material in trough 35 to a suitable outlet 37 for removal.

A plurality of longitudinally spaced vertical transverse partitions 40 are arranged between the horizontal upper wall 29 of the first enclosure and the outer top panel 15 between adjacent access openings 19 to sealingly subdivide the large volume therebetween into a plurality of smaller reception chambers 41, each of which is located immediately beneath an access cover 21. These access covers 21 may be selectively removed to expose the reception chamber and filter bags immediately therebeneath for servicing or maintenance. Thus, each reception chamber 41 extends the width of the dust collector and is bounded or defined by a second enclosure 42 which joins the upper wall 29 of the first enclosure 26. Except for the reception chambers located adjacent the front and rear end panels 11, 12, this second enclosure 42 includes an access cover 21, a collar 20, a portion of the outer top panel 15, and a pair of lateral partitions 40 (FIG. 5). Portions of the front and rear end panels 11, 12 form one of the vertical partitions of the two reception chambers arranged at the front and rear ends of the dust collector (FIG. 5). The preferred embodiment illustrated in the drawings is shown as having eighteen reception chambers 41 arranged side by side for the full length of the dust collector (FIG. 1), although any other number may be provided as desired.

The plurality of openings 30 is provided through the horizontal upper wall 29 to permit gas to flow into each of the several reception chambers 41 from the common entrance chamber 28. As best shown in FIGS. 3 and 5, the illustrated embodiment has two transverse rows of fourteen openings 30 each in the floor of each reception chamber 41 and communicating with the entrance chamber 28. Any number of rows of openings, and any number of openings in each such row, may be provided as desired, as further illustrated in the modification of FIGS. 7 and 8.

A plurality of cylindrical wire cage-supported filter bags 43 are arranged to close outlet openings 30 and are operative to separate solid or particulate material from cleaned gas passing therethrough. As best shown in FIGS. 3 and 5, each filter bag 43 has a large area cylindrical surface and is arranged to be hung or suspended within entrance chamber 28 by an upper annular collar 44 resting on the top surface of upper wall 29. These filter bags 43 may be made of any filter medium having interstices or pores capable of being penetrated by the gas to be cleaned while preventing the passage of particulare matter therethrough. In a preferred embodiment, such filter medium may be finely woven or spun fibrous material.

A plurality of longitudinally spaced lower transverse partitions 45 are vertically arranged in the space between the left and right upper side walls 31, 32 of the first or inner enclosure 26 and their adjacent outer side panels 13 and 14, respectively, to sealingly subdivide this space into a plurality of vertical left and right elongated rectangular conduits 46 and 48, respectively, each of which at its upper end communicates with a reception chamber 41 and serves to provide a duct-like passageway for directing a flow of cleaned gas from the reception chamber downwardly. Thus, the first or left conduit 46 is defined by first conduit means having a third wall joining the second or left upper side wall 31, and the second or right conduit is defined by second conduit means having a fifth wall joining the fourth or right upper side wall 32. Specifically, the third wall of the first conduit means includes two adjacent partitions 45 arranged between left side wall 31 and left outer side panel 13, and a portion of left outer side panel 13 joining these partitions; and the fifth wall of the second conduit means includes two adjacent partitions 45 arranged between right side wall 32 and right side outer panel 14, and portion of right outer panel 14 joining these partitions.

Specifically, one of the left conduits 46 and the corresponding one of the right conduits 48 communicate with opposite ends of a given one of the eighteen reception chambers 41 to direct flows of cleaned gas therefrom. The first or left conduits 46 severally direct first flows of cleaned gas downwardly from their corresponding reception chambers to a common lower left plenum chamber 49 having a generally triangular cross-section bounded by a lower portion of the left outer side panel 13, the bottom panel 16, and the inclined left lower side wall 33 of the first enclosure. Outlet 24 is provided through left outer side panel 13 to exhaust cleaned gas from the lower left plenum chamber 49. Similarly, the second or right conduits 48 severally direct second flows of cleaned gas downwardly from their corresponding reception chambers to a common lower right plenum chamber 50 also having a generally triangular cross-section bounded by a lower portion of right outer side panel 14, bottom panel 16, and the inclined right lower side wall 34 of the first enclosure. Outlet 25 is provided through the right outer side panel 14 to exhaust gas from the lower right plenum chamber 50.

In normal operation, a flow entrance gas enters entrance chamber 28 of the dust collector through inlet 23, is cleaned as it passes through the filter bags 43, enters the plurality of separated reception chambers 41, and is directed down through the left and right conduits 46, 48 to the respective lower plenum chambers 49, 50 and thence to exhaust. The separated solid or particulate material is retained within the entrance chamber 28 and falls down the inclined sides 33, 34 of the hopper and into trough 35 from which it may be periodically removed by operation of screw conveyor 38. This "double-wall" type of construction has particular usage where the entrance gas enters the dust collector at an elevated temperature. When the apparatus is employed with such hot gas, the unique structure of providing the first enclosure within the outer rectangular box serves to insulate the entrance chamber from the ambient atmosphere. Thus, the hot entrance gas is not rapidly cooled within the entrance chamber and the possibility of vapor condensation is reduced.

In practice, however, it has been found that some of the suspended solids tend to collect on and clog the gas-permeable filter medium, such obstruction increasing the frictional resistance of gas flow therethrough and lowering the efficiency of the dust collector.

Accordingly, each of the left and right vertical conduits 46, 48 is provided with venturi jet pump means represented generally by the numeral 51. As best illustrated in FIG. 4, each of these means 51 is arranged between adjacent pairs of partitions 45 and includes an upper diffuser section 52, an intermediate narrowed throat section 53, a lower diffuser section 54, and a nozzle 55 arranged at this lower diffuser section to direct a jet of compressed gas upwardly toward this throat section. Upon diffuser section 52 is formed by a pair of downwardly converging transverse walls 52', throat section 53 by a pair of parallel transverse walls 53', and lower diffuser section 54 by a pair of downwardly diverging transverse walls 54'. These various transverse walls 52', 53', 54' of each of the venturi jet pump means are interposed between the corresponding pair of spaced side walls 13, 31 or 14, 32, and may be conveniently formed by bending a single strip of sheet metal as shown.

Since normal flow of cleaned gas through conduits 46, 48 is downwardly, upper diffuser section 52 is normally upstream, and lower diffuser section 54 is normally downstream, of the intermediate throat section 53. However, when the venturi jet pump means 51 is operating, the cleaned gas is induced to flow upwardly. Accordingly, to handle this bidirectional flow of cleaned gas the upper and lower diffuser sections 52, 54 are similar in length and preferably take advantage of the available length of conduit 46 or 48 to minimize energy or total pressure loss when static pressure interchanges with velocity pressure as the gas flows through the venturi. An included angle between each cooperative pair of inclined walls 52', 52' or 54', 54' of from about 20 degrees to about 25 degrees is preferred.

In order for the mass ratio of the pumped gas to the jet gas to be high, a ratio of 7 to 1 being preferred, the throat section 53 of the venturi is made relatively long. In fact, it is preferred to provide the throat and diffuser sections 52–54 of substantially equal length one to another. The particular structure of my double wall dust collector providing relatively long vertical conduits 46, 48 on opposite sides of the bag compartment advantageously permits this length to be utilized efficiently to provide the elongated venturi-section configurations, without in any way providing intermediate structure across the top of the bag compartment to interfere with access to the bags for replacement or servicing.

As best shown in FIGS. 3, 4 and 6, an upwardly discharging jet nozzle 55 is arranged within each of the left and right conduits 46, 48 adjacent the lower and larger end of the lower diffuser section 54. Each of these jet nozzles 55 is shown mounted on an L-shaped pipe 56, the lower horizontal leg of which extends through the adjacent outer side panel 13 or 14 and communicates with a solenoid-operated diaphragm valve 58 operatively connected to manifold pipe 59 or 60. These left and right manifold pipes 59, 60 extend horizontally along the outer side panels 13, 14 and deliver a common supply of pressurized gas to the several nozzles, derived from any suitable source (not shown). The solenoids 61 for the various diaphragm valves 58 are individually energizable by suitable control apparatus (not shown). The solenoids 61 of opposite diaphragm valves 58 on the left and right sides of a given reception chamber may be electrically synchronized to cause jets of gas of equal phase and duration to be simultaneously discharged from nozzles 55 in opposite left and right conduits 46, 48. The supply means therefore includes the manifold pipes and the solenoid-operated diaphragm valves operatively mounted thereon. The configuration of jet nozzles 55 is selected so as to discharge high velocity jets of gas upwardly toward and through the throat sections 53 countercurrent to the normal flow of cleaned gas therethrough. As these momentary jets discharge upwardly they induce or pump a flow of cleaned gas upwardly. It is desirable to reverse the flow of the greatest mass of available cleaned gas in as short a time as possible so that pressure on the inside of bags 43 will rise abruptly to shock off any cake of particulate material that had accumulated on the exteriors of these bags.

These pulses of pumped gas travel up their respective conduits 46, 48 and enter opposite ends of their reception chamber 41 where they are further directed to impinge or impact upon one another to seek a common outlet through the filter bags 43 communicating that reception chamber with the entrance chamber. This augments the pressure peak utilized for shocking the bags. The unique configuration of the dust collector permits simultaneous discharge of two pulses of compressible gas which are caused to be directed at one another to produce a momentry shock wave through the filter bags, thereby dislodging solid or particulate material collected thereon.

It should be clearly understood that the induced countercurrent flow of reverse air is momentary and does not require the dust collector to be shut-down. The several reception chambers and conduits are isolated from one another to maintain the velocities of the purge gas pulses. It will also be noted that there are no gas valves or dampers required to be actuated to effect the momentary reverse flow for bag cleaning purposes.

In practice, I prefer to successively activate opposing pairs of left and right nozzles 55 along the length of the dust collector to sequentially clean or backwash the filter bags of each reception chamber. The jet gas may simple be compressed air or any other gaseous fluid effective to accomplish the desired function.

A modified form of the present invention is illustrated in FIGS. 7 and 8 in which the corresponding reference numerals indicate like elements heretofore described. This embodiment is particularly suitable to dust collectors of smaller capacity or where the entrance gas is relatively cool so that vapor condensation does not pose an appreciable problem.

As can be readily visualized from FIG. 7, the left conduits have been eliminated so that cleaned gas in the reception chambers 41 is restricted to flow toward exhaust through the right conduits 48.

A third enclosure 70 is provided having a horizontal rectangular top wall 71 extending rightwardly as an extension of top panel 15, a rectangular bottom wall 72 extending horizontally outwardly from right upper side wall 32, and a vertically arranged rectangular panel 73 spaced from the right outer side panel 14 and connecting the top and bottom walls 71, 72, respectively, of the third enclosure so as to cross-sectionally define a lateral plenum chamber 74 therewithin running the longitudinal extent of the dust collector between the front and rear end panels 11, 12, respectively. Thus, the several conduits 48 communicate their respective reception chambers 41 with the common lateral plenum chamber 74. As best shown in FIG. 7, an outlet 75 is provided through vertical panel 73 to exhaust cleaned gas to the atmosphere or to direct its flow to other duct work (not shown).

In this modified embodiment, a manifold pipe 60 is longitudinally arranged below bottom wall 72 to deliver a supply of pressurized jet gas, such as compressed air, to the several jet nozzles 55. Specifically, each jet nozzle 55 is mounted on a straight pipe 76, the lower portion of which extends through a cooperatively configured hole through bottom wall 72 and communicates with a solenoid-operated diaphragm valve 58 operatively connected to manifold pipe 60.

In operation, this modified embodiment functions substantially as before described for the form of the invention shown in FIGS. 1–6. A flow of entrance gas enters the entrance chamber 28 through inlet 23 and is caused to flow through the filter bags 43 into the plurality of reception chambers 41. This cleaned gas is then directed down through conduits 48 into plenum chamber 74 and thence to exhaust.

The diaphragm valves 58 may be selectively activated to discharge high energy jets of gas through nozzles 55 up into the venturi-sections 52–54 countercurrent to the normal downward flow of cleaned gas. These jets pump cleaned gas in a reverse direction to induce a momentary reverse flow of gas in the reception chamber and through the filter medium to dislodge particulate material collected thereon. The length of the conduits 48 is sufficient to permit diffuser sections 52, 54 to converge toward the throat section 53 at a desirable angle in the approximate 20 to 25 degree range to allow efficient energy recovery.

Thus, this modified embodiment provides a unique dust collector for less demanding applications while maintaining several of the primary advantages of the opposed-pulse system, first described.

While a preferred embodiment of the present invention has been shown and described, it should be understood that various changes and modifications may be made without departing from the original spirit of the invention as defined by the following claims.

What is claimed is:

1. A dust collector, comprising:
   a first enclosure defining an entrance chamber arranged to receive entrance gas laden with particulate material, said first enclosure having a first wall provided with an outlet opening and also having a second wall;
   a gas-permeable filter medium closing said opening to separate said particulate material from cleaned gas passing through said filter medium;
   a second enclosure joining said first wall to define a reception chamber to receive said cleaned gas;
   first conduit means having a third wall operatively joining said second wall to provide a first conduit communicating with said reception chamber to convey a first flow of cleaned gas thereaway in a normal direction; and
   first venturi jet pump means arranged in said first conduit and selectively operable to cause cleaned gas to flow in a direction opposite to said normal direction for abruptly raising the pressure on the cleaned gas side of said filter medium to shock off particulate matter collected on the opposite side thereof.

2. A dust collector according to claim 1 wherein said first venturi jet pump means includes a normally upstream diffuser section, a normally downstream diffuser section, an intermediate throat section, and a nozzle arranged to discharge a jet of compressed gas in said opposite direction toward said throat section.

3. A dust collector according to claim 2 wherein said diffuser sections are of substantially equal length.

4. A dust collector according to claim 2 wherein said throat and diffuser sections are of substantially equal length one to another.

5. A dust collector according to claim 2 wherein said first venturi jet pump means includes transverse walls extending between said second and third walls to provide said throat diffuser sections.

6. A dust collector according to claim 5 wherein said throat and diffuser sections are of substantially equal length one to another.

7. A dust collector according to claim 5 wherein said diffuser sections are of substantially equal length and the said transverse walls of each of said diffuser sections are at an included angle to each other of from about 20° to about 25°.

8. A dust collector according to claim 1 wherein said first wall is substantially horizontal and has a plurality of openings corresponding to said outlet opening and said second wall is substantially vertical, said filter medium is provided for each of said openings and comprises a wire cage-supported filter bag.

9. A dust collector according to claim 1 wherein said first enclosure includes a fourth wall and further comprising second conduit means having a fifth wall operatively joining said fourth wall to provide a second conduit communicating with said reception chamber to convey a second flow of cleaned gas thereaway in a normal direction, selectively operable second venturi jet pump means arranged in said second conduit for a purpose similar to that of said first venturi jet pump means, each of said jet pump means including a nozzle, and means arranged to supply compressed gas simultaneously to such nozzles to create jets for causing said reverse flow of cleaned gas.

10. A dust collector according to claim 9 wherein said first wall is substantially horizontal and has a plurality of openings corresponding to said outlet opening, said second and fourth walls are substantially vertical, said filter medium is provided for each of said openings and comprises a wire cage-supported filter bag, said second enclosure is joined to said first wall to provide said reception chamber which has opposite ends, said first conduit means includes a third wall spaced from said second wall to define said first conduit which communicates with one end of said reception chamber, said second conduit means includes a fifth wall spaced from said fourth wall to define said second conduit which communicates with the opposite end of said reception chamber, each of said venturi pump means includes transverse walls extending between such spaced walls of the corresponding one of said conduits to provide an upper diffuser section, a lower diffuser section and an intermediate throat section, said nozzles being severally arranged at said lower diffuser sections to direct said jets upwardly toward said throat sections.

* * * * *

UNITED STATES PATENT OFFICE
CERTIFICATE OF CORRECTION

Patent No. 3,864,108      Dated February 5, 1975

Inventor(s) Roger S. Brookman

It is certified that error appears in the above-identified patent and that said Letters Patent are hereby corrected as shown below:

Col. 1, line 39:    "cleaniong" should be --cleaning--;
Col. 2, line 2:    --toward-- should be inserted between "flow" and "such";
Col. 3, line 59:    "36" should be --39--;
Col. 4, line 45:    "particulare" should be --particulate--;
Col. 5, line 63:    "Upon" should be --Upper--;
Col. 7, line 11:    "momentry" should be --momentary--;
       line 26:    "simple" should be --simply--.

Signed and Sealed this twenty-sixth Day of August 1975

[SEAL]

Attest:

RUTH C. MASON
*Attesting Officer*

C. MARSHALL DANN
*Commissioner of Patents and Trademarks*